US011245807B2

(12) United States Patent
Nishino

(10) Patent No.: US 11,245,807 B2
(45) Date of Patent: Feb. 8, 2022

(54) IMAGE PROCESSING APPARATUS

(71) Applicant: KYOCERA Document Solutions Inc., Osaka (JP)

(72) Inventor: Tetsuya Nishino, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 156 days.

(21) Appl. No.: 16/858,878

(22) Filed: Apr. 27, 2020

(65) Prior Publication Data

US 2020/0366804 A1    Nov. 19, 2020

(30) Foreign Application Priority Data

May 16, 2019    (JP) .............................. JP2019-093240

(51) Int. Cl.
*H04N 1/00* (2006.01)
*G06K 9/00* (2006.01)
*G06K 9/20* (2006.01)

(52) U.S. Cl.
CPC ..... *H04N 1/00854* (2013.01); *G06K 9/00442* (2013.01); *G06K 9/20* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 6,747,756 B1* | 6/2004 | Tanabe .................. | G06K 15/00 358/1.16 |
| 2005/0100378 A1* | 5/2005 | Kimura ................. | G06F 21/608 400/76 |
| 2008/0030763 A1* | 2/2008 | Kitada .................. | G06F 3/1234 358/1.14 |
| 2008/0079993 A1* | 4/2008 | Kanamoto ............ | G06F 3/1204 358/1.15 |
| 2008/0170259 A1* | 7/2008 | Koshika ................ | G06F 3/1274 358/1.15 |
| 2009/0041360 A1* | 2/2009 | Ohira .................. | G06K 9/00885 382/201 |

(Continued)

FOREIGN PATENT DOCUMENTS

JP    2010-034737    2/2010

*Primary Examiner* — Anh-Vinh Thi Nguyen
(74) *Attorney, Agent, or Firm* — Lex IP Meister, PLLC

(57) ABSTRACT

An image forming apparatus includes an image reading device, a printing device, a specific character string detector, and a controller. The specific character string detector extracts a specific area image, enlarges the specific area image, executes character recognition processing on the enlarged specific area image to detect a character string, and determines whether or not the detected character string includes a predetermined specific character string. The controller prohibits copying of the document image when the predetermined specific character string is included in the detected character string. The size of the specific character string before enlargement is smaller than a lower limit character string size of character recognition in the character recognition processing, and the size of the specific character string after enlargement is equal to or larger than the lower limit character string size of character recognition in the character recognition processing.

5 Claims, 3 Drawing Sheets

(56) References Cited

U.S. PATENT DOCUMENTS

| | | | |
|---|---|---|---|
| 2009/0140998 A1* | 6/2009 | Jung | G06F 3/0488 |
| | | | 345/173 |
| 2010/0110498 A1* | 5/2010 | Sakaue | H04N 1/00848 |
| | | | 358/3.28 |
| 2014/0320888 A1* | 10/2014 | Baek | G06F 21/335 |
| | | | 358/1.14 |
| 2017/0090841 A1* | 3/2017 | Totsuka | G06F 3/1222 |
| 2019/0163972 A1* | 5/2019 | Omiya | G06F 3/1285 |
| 2019/0317710 A1* | 10/2019 | Saito | G06F 3/1208 |

* cited by examiner

IMAGE PROCESSING APPARATUS

INCORPORATION BY REFERENCE

This application is based upon and claims the benefit of priority from the corresponding Japanese Patent Application No. 2019-093240 filed on May 16, 2019, the entire contents of which are incorporated herein by reference.

BACKGROUND

The present disclosure relates to an image forming apparatus.

An image forming apparatus, for example, prohibits copying of a document when a specific character string indicating copying prohibition is detected by a character recognition technique in a document image optically read from the document.

However, when such specific character string is arranged in the document, the arrangement of objects (text, figure, photograph, etc. designated by the user) in the document is restricted by the arrangement of the specific character string. In addition, if the specific character string is made small in order to suppress such a restriction, there is a possibility that it cannot be accurately detected by the character recognition technique.

The present disclosure provides an image forming apparatus capable of accurately detecting a specific character string indicating copying prohibition (hereinafter referred to as "copy guard character string") by a character recognition technique while suppressing a restriction on the arrangement of objects in a document.

SUMMARY

An image forming apparatus according to the present disclosure includes an image reading device, a printing device, a specific character string detector, and a controller. The specific character string detector (a) extracts a specific area image from a specific area in a document image to be copied read by the image reading device in a copy job, (b) enlarges the specific area image extracted at a predetermined magnification, (c) executes character recognition processing on the specific area image after enlargement to detect a character string included in the specific area, and (d) determines whether or not the character string detected includes a predetermined specific character string. The controller prohibits copying of the document image when it is determined that the predetermined specific character string is included in the character string detected by the specific character string detector, and causes the printing device to print a copy of the document image when it is not determined that the predetermined specific character string is included in the character string detected by the specific character string detector. The predetermined magnification is set based on a size of the specific character string and a lower limit character string size of character recognition in the character recognition processing. The size of the specific character string before enlargement is smaller than the lower limit character string size of character recognition in the character recognition processing, and the size of the specific character string after enlargement is equal to or larger than the lower limit character string size of character recognition in the character recognition processing.

DETAILED DESCRIPTION

Embodiments of the present disclosure will be described below with reference to the drawings.

First Embodiment

Figure 1:
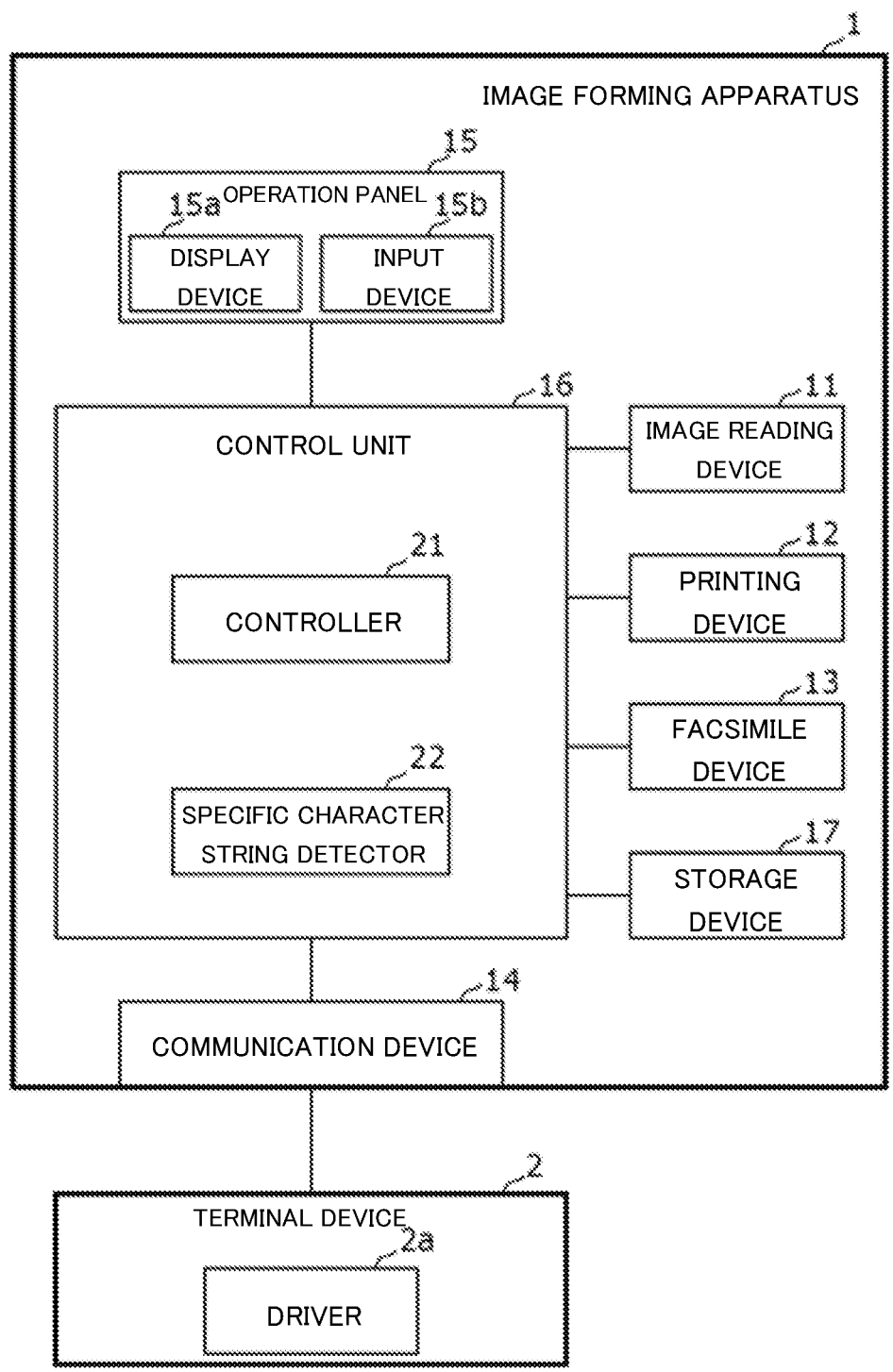
FIG. 1 is a block diagram showing a configuration of an image forming apparatus according to an embodiment of the present disclosure.

FIG. 1 is a block diagram showing a configuration of an image forming apparatus according to an embodiment of the present disclosure.

An image forming apparatus 1 shown in FIG. 1 is such an image forming apparatus as a multifunction peripheral. The image forming apparatus 1 shown in FIG. 1 includes an image reading device 11, a printing device 12, a facsimile device 13, a communication device 14, an operation panel 15, a control unit 16, and a storage device 17.

The image reading device 11 is an internal device that optically reads a document image from a document placed on a platen glass or a document fed by an automatic document feeder (ADF) at a designated resolution and generates image data of the document image.

The printing device 12 is an internal device for printing a document image or the like by an electrophotographic method or an inkjet method.

The facsimile device 13 is an internal device that transmits image data obtained by scanning as a facsimile signal, and receives a facsimile signal to generate image data.

The communication device 14 is a network interface, a short-range communication interface or the like, and is an internal device that performs data communication with a terminal device 2 or the like. The terminal device 2 is a personal computer or the like having a data communication function and executes a driver program to operate as a driver 2a for transmitting a job request for a print job to the image forming apparatus 1 (communication device 14).

The operation panel 15 is an internal device that is disposed on an upper surface side of a housing of the image forming apparatus 1 and has a display device 15a for displaying an operation screen toward a user and an input device 15b for accepting a user operation. The display device 15a is a liquid crystal display or the like. The input device 15b is hard keys, a touch panel realizing soft keys together with the display device 15a, or the like.

The control unit 16 includes a computer having a central processing unit (CPU), a read only memory (ROM), a random access memory (RAM), and the like, and operates as various processing units. The storage device 17 is a non-volatile storage device such as a flash memory, and stores data and programs. The control unit 16 loads a program stored in the ROM or the storage device 17 into the RAM, executes the program by the CPU, and operates as various processing units by software. Here, the control unit 16 operates as a controller 21 and a specific character string detector 22.

The controller 21 controls the internal devices to execute various processes of a requested job and the like.

The specific character string detector 22 (a) extracts a specific area image from a specific area in a document image to be copied read by the image reading device 11 in a copy job, (b) enlarges the extracted specific area image at a predetermined magnification, (c) executes character recognition processing on the enlarged specific area image to detect a character string included in the specific area, and (d) determines whether or not the detected character string includes a predetermined specific character string (copy guard character string).

Figure 2:
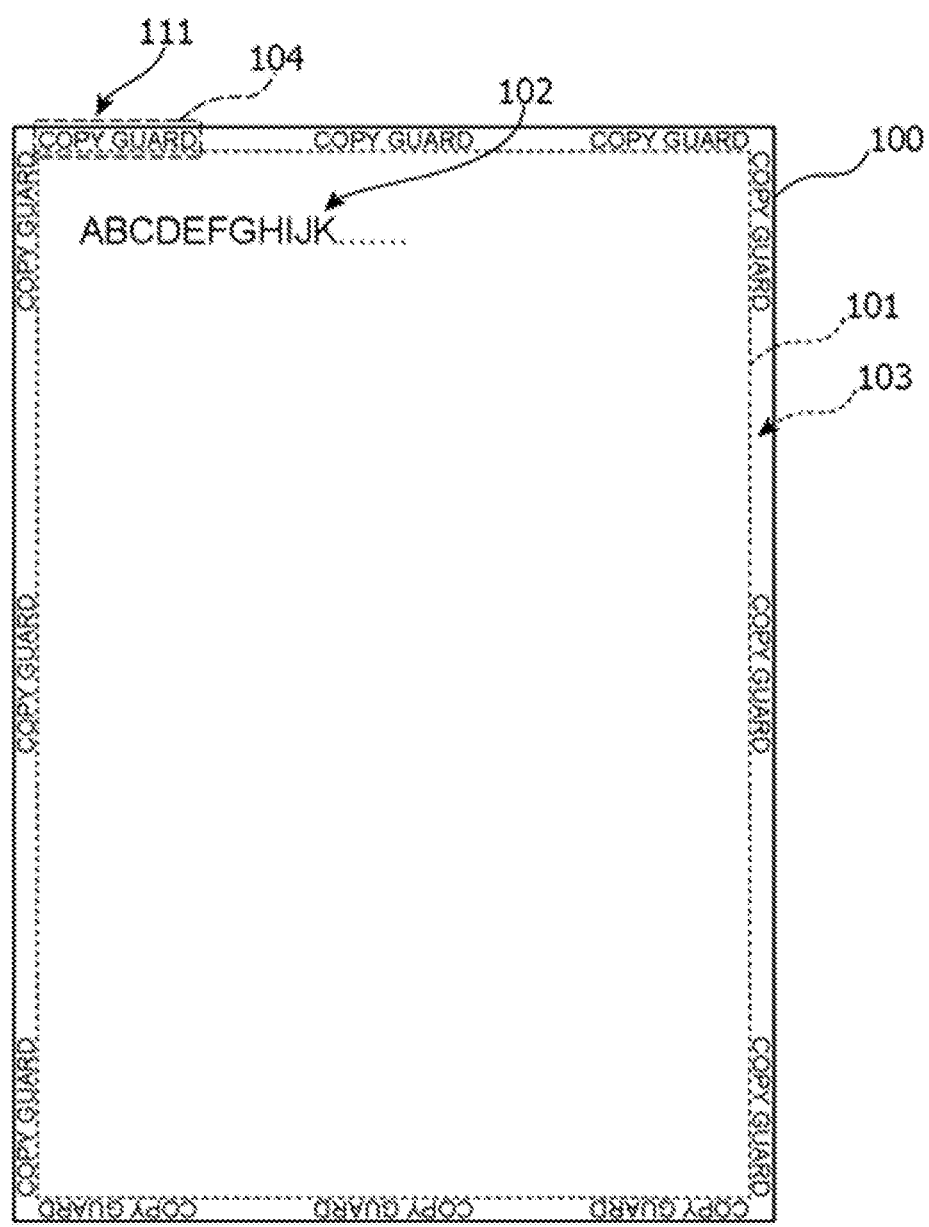
FIG. 2 is a diagram illustrating an arrangement of a copy guard character string in a first embodiment.

FIG. 2 is a diagram illustrating an arrangement of a copy guard character string in a first embodiment.

For example, as shown in FIG. 2, a printable area 101 is set in a sheet area 100 of a size corresponding to the size of a print sheet used in the copy job, and an object 102 designated by the user is arranged in the printable area 101 (that is, the object 102 designated by the user is not arranged outside the printable area 101).

As shown in FIG. 2, for example, a specific area 104 is set along the outer edge of the printable area 101, and the copy guard character string 111 is printed in the specific area 104. In other words, the copy guard character string 111 ("COPY GUARD" in FIG. 2) is printed outside the printable area 101 in the document whose copying is to be prohibited. The copy guard character string may be composed of one word or a plurality of words as shown in FIG. 2. Note that the copy guard character string 111 is not printed for a document whose copying does not need to be prohibited.

The copy guard character string 111 may be printed at a plurality of positions, as shown in FIG. 2. The specific area 104 may be part of a margin area 103 outside the printable area 101, or the entire margin area 103 outside the printable area 101. The specific area 104 may be one or more in number as long as it includes an area in which the copy guard character string 111 is printed.

The "predetermined magnification" is set based on the size of the specific character string and the lower limit character string size of character recognition in the character recognition processing. The size of the specific character string before enlargement is smaller than the lower limit character string size of character recognition in the character recognition processing, and the size of the specific character string after enlargement is equal to or larger than the lower limit character string size of character recognition in the character recognition processing. Note that the resolution of the enlarged specific area image is the same as the resolution of the specific area image before enlargement (that is, the number of pixels is increased by enlargement). Anti-aliasing may be performed at the time of enlargement.

When the lower limit character string size of character recognition (that is to say, the character string size at which the character recognition rate is equal to or greater than a predetermined value) is 10 points and the size of the specific character string is set to 5 points, for instance, the predetermined magnification is set at 2× (or at a predetermined magnification higher than 2×).

In the copy job, when it is determined that a predetermined specific character string is included in the character string detected by the specific character string detector 22, the controller 21 prohibits copying of the document image. When it is not determined that a predetermined specific character string is included in the character string detected by the specific character string detector 22, the controller 21 causes the printing device 12 to print a copy of the document image.

When the addition of the specific character string is designated in the print command (namely, the job request for the print job) from the driver 2a of the terminal device 2, the controller 21 adds the specific character string to the specific area 104, and prints the image designated by the print command with the printing device 12. When the addition of the specific character string is not designated in the print command from the driver 2a of the terminal device 2, the controller 21 prints the image designated by the print command by the printing device 12 without adding the specific character string to the specific area 104. The print command is described in, for example, a page description language.

The specific area 104 is set along the outer edge of the predetermined printable area 101 in which the object designated by the user in the print command is to be arranged. In the first embodiment, the specific character string is added outside the printable area 101.

When the specific character string is added outside the printable area 101, for example, the arrangement position of the specific character string is not designated in the print command, and the controller 21 arranges the specific character string at a position designated in advance. In that case, the specific character string is appropriately arranged even if the driver 2a does not have a function of designating the arrangement position of the specific character string in the print command.

Alternatively, when the specific character string is added outside the printable area 101, the arrangement position of the specific character string may be designated in the print command. In that case, a position (for example, a negative value of the X coordinate and/or the Y coordinate) outside the range of the designatable position (X-Y coordinate values) in the printable area 101 is designated. In that case, the controller 21 arranges the specific character string according to the print command from the driver 2a even without a function of uniquely arranging the specific character string in the print job.

In the case of a copy job, the controller 21 does not add the specific character string.

Next, the operation of the image forming apparatus 1 will be described.

The controller 21 accepts the job request. For example, the controller 21 accepts the job request for the copy job based on a user operation from the operation panel 15. Further, for example, the controller 21 accepts, with the communication device 14, the job request for the print job from the driver 2a.

When the job request for the print job has been accepted, the controller 21 determines whether or not addition of the specific character string (copy guard character string 111) is instructed in the job request. When addition of the specific character string (copy guard character string 111) is instructed in the job request, the controller 21 generates an image to be printed based on the job request, adds the specific character string to the predetermined specific area 104 in the generated image, and causes the printing device 12 to print the image to which the specific character string has been added. On the other hand, when the addition of the specific character string (copy guard character string 111) is not instructed in the job request, the controller 21 generates an image to be printed based on the job request, and causes the printing device 12 to print the image without adding the specific character string.

When the job request for the copy job has been accepted, the controller 21 controls the image reading device 11 to read a document image, acquires (image data of) the document image from the image reading device 11, and causes the specific character string detector 22 to attempt detection of the copy guard character string 111 for the document image. The specific character string detector 22 extracts a specific area in the document image and enlarges the extracted specific area at a predetermined magnification to generate an enlarged image namely, an enlarged specific area image) and execute character recognition processing on the enlarged image.

When a character string is detected in the character recognition processing for the enlarged image, the specific character string detector 22 determines whether or not a predetermined specific character string is included in the detected character string. The specific character string detector 22 (a) determines that the predetermined specific character string is detected in the document image when the predetermined specific character string is included in the detected character string, and (b) determines that the predetermined specific character string is not detected in the document image when the predetermined specific character string is not included in the detected character string and when no character string is detected in the character recognition processing.

When it is determined that the predetermined specific character string is detected in the document image, the controller 21 prohibits copying of the document image and discards the image data of the document image without printing the document image. On the other hand, when it is determined that the predetermined specific character string is not detected in the document image, the controller 21 permits copying of the document image and prints the document image by the printing device 12.

As described above, according to the first embodiment, the specific character string detector 22 (a) extracts a specific area image from the specific area 104 in the document image to be copied read by the image reading device 11 in a copy job, (b) enlarges the extracted specific area image at a predetermined magnification, (c) executes character recognition processing on the enlarged specific area image to detect a character string included in the specific area 104, and (d) determines whether or not the detected character string includes a predetermined specific character string. When it is determined that the predetermined specific character string is included in the character string detected by the specific character string detector 22, the controller 21 prohibits copying of the document image, and when it is not determined that the predetermined specific character string is included in the character string detected by the specific character string detector 22, the controller 21 causes the printing device 12 to print a copy of the document image. The predetermined magnification is set based on the size of the specific character string and the lower limit character string size of character recognition in the character recognition processing. The size of the specific character string before enlargement is smaller than the lower limit character string size of character recognition in the character recognition processing, and the size of the specific character string after enlargement is equal to or larger than the lower limit character string size of character recognition in the character recognition processing.

As a result, the size of the specific character string (copy guard character string) indicating copying prohibition is reduced to suppress the restriction of the arrangement of objects in the document and the specific area, in which the copy guard character string may be included, is enlarged before the character recognition processing is executed, so that the copy guard character string can be accurately detected by the character recognition technique.

Second Embodiment

Figure 3:
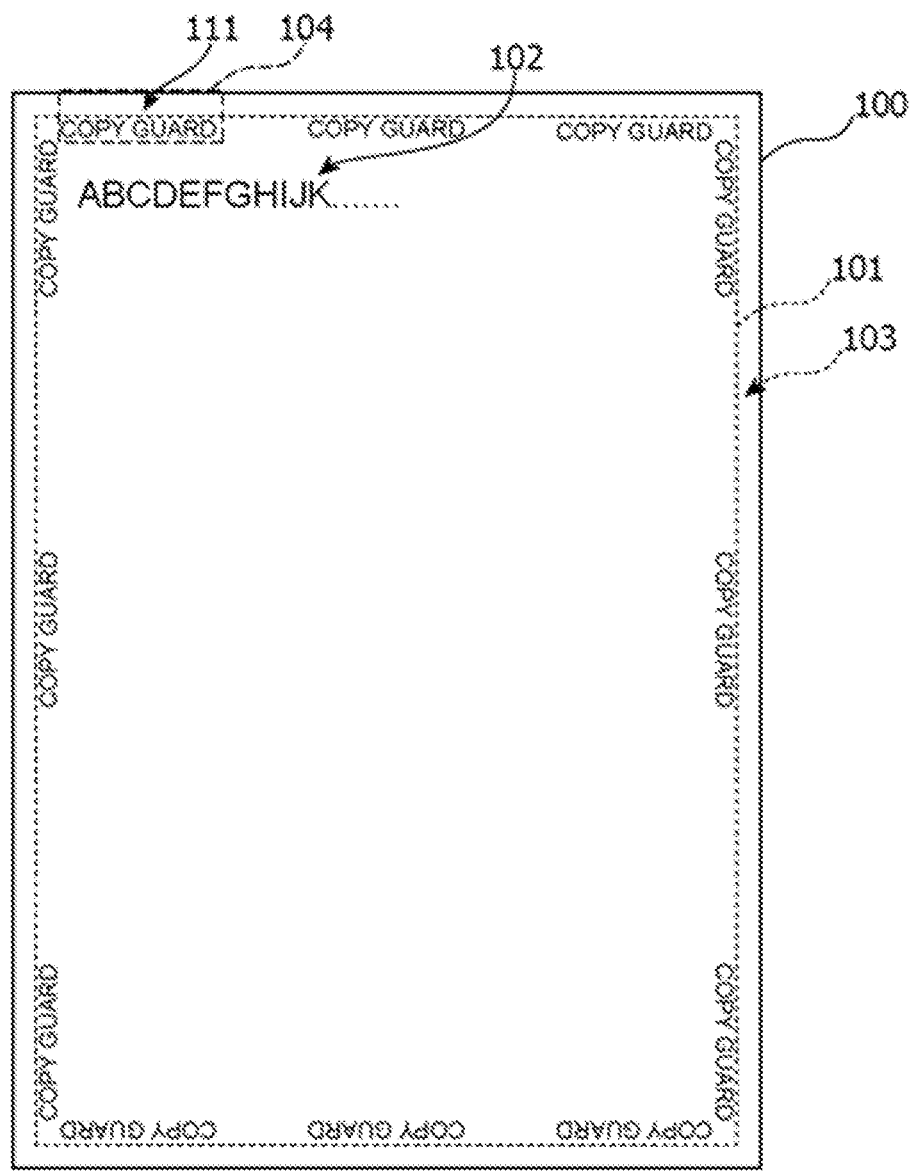
FIG. 3 is a diagram illustrating an arrangement of a copy guard character string in a second embodiment.

FIG. 3 is a diagram illustrating an arrangement of a copy guard character string in second embodiment. In the second embodiment, the specific area 104 is set along the outer edge of the printable area 101, and the specific character string as above is added inside the printable area 101.

Since the configuration and operation of the image forming apparatus according to the second embodiment are the same as those of the first embodiment except for the above arrangement, the description thereof will be omitted.

Various changes and modifications to the above-described embodiments will be apparent to those skilled in the art. Such changes and modifications may be made without departing from the spirit and scope of their subject matter and without diminishing their intended advantages. It is therefore intended that such changes and modifications be covered by the appended claims.

For example, in the first and second embodiments, the controller 21 may determine whether or not to execute the character string detection by the specific character string detector 22 and the document image copying prohibition based on at least one of the department to which the user who has requested the copy job belongs, the user name, and the user authority. In that case, if at least one of the department to which the user belongs, the user name, and the user authority satisfies a predetermined condition, the copying of the document image is immediately executed without executing the character string detection by the specific character string detector 22. The user who has requested the copy job (namely, the login user of the image forming apparatus 1) is specified in the login process, and the department to which the specified user belongs, the user name, the user authority, and the like are specified based on pre-registered user data.

When the user authority resides in an administrator user, for instance, the character string detection by the specific character string detector 22 and the document image copying prohibition are not executed. When the user authority resides in a general user, the character string detection by the specific character string detector 22 and the document image copying prohibition (only when the specific character string is detected) are executed.

In the first and second embodiments, the controller 21 may determine whether or not to execute the character string detection by the specific character string detector 22 and the document image copying prohibition based on the time period, within which the job request for the copy job has been accepted. In that case, if the time period, within which the copy job has been accepted, satisfies a predetermined condition, the document image is immediately copied without executing the character string detection by the specific character string detector 22.

For example, when the time period, within which the job request for the copy job has been accepted, is a working time period (for example, from 8 to 17 o'clock), the character string detection by the specific character string detector 22 and the document image copying prohibition are not executed, and when the time period, within which the job request for the copy job has been accepted, is other than the working time period, the character string detection by the specific character string detector 22 and the document image copying prohibition (only when the specific character string is detected) are executed.

What is claimed is:

1. An image forming apparatus comprising:
   an image reading device;
   a printing device;
   a specific character string detector that (a) extracts a specific area image from a specific area in a document image to be copied read by the image reading device in a copy job, (b) enlarges the specific area image extracted at a predetermined magnification, (c) executes character recognition processing on the specific area image after enlargement to detect a character string included in the specific area, and (d) determines whether or not the character string detected includes a predetermined specific character string; and a controller that prohibits copying of the document image when it is determined that the predetermined specific character string is included in the character string detected by the specific character string detector, and causes the printing device to print a copy of the document image when it is not determined that the predetermined specific character string is included in the character string detected by the specific character string detector, wherein the predetermined magnification is set based on a size of the specific character string and a lower limit character string size of character recognition in the character recognition processing, and wherein the size of the specific character string before enlargement is smaller than the lower limit character string size of character recognition in the character recognition processing, and the size of the specific character string after enlargement is equal to or larger than the lower limit character string size of character recognition in the character recognition processing.

2. The image forming apparatus according to claim 1, wherein, when addition of the specific character string is designated in a print command from a driver of a terminal device, the controller adds the specific character string to the specific area and prints an image designated by the print command with the printing device, and wherein, when addition of the specific character string is not designated in the print command from the driver of the terminal device, the controller prints the image designated by the print command with the printing device without adding the specific character string to the specific area.

3. The image forming apparatus according to claim 2, wherein the specific area is set along an outer edge of a predetermined printable area, in which an object designated by a user in the print command is arranged, and wherein the specific character string is added outside or inside the printable area.

4. The image forming apparatus according to claim 1, wherein the controller determines whether or not to implement character string detection by the specific character string detector and whether or not to prohibit copying of the document image based on at least one of a department, to which a user requesting the copy job belongs, a user name, and a user authority.

5. The image forming apparatus according to claim 1, wherein the controller determines whether or not to execute character string detection by the specific character string detector and whether or not to prohibit copying of the document image based on a time period, within which a job request for the copy job has been accepted.

* * * * *